United States Patent [19]

Carlson

[11] Patent Number: 5,601,031
[45] Date of Patent: Feb. 11, 1997

[54] CONSTANT CONTACT SIDE BEARING

[75] Inventor: Robert L. Carlson, Skokie, Ill.

[73] Assignee: Miner Enterprises, Inc., Geneva, Ill.

[21] Appl. No.: 260,290

[22] Filed: Jun. 14, 1994

[51] Int. Cl.$^6$ ..................................... B61F 5/00
[52] U.S. Cl. ........................... 105/199.3; 267/3; 384/423
[58] Field of Search ............................ 105/199.3, 199.4; 267/153, 269, 292, 293, 6, 3; 384/423

[56] References Cited

U.S. PATENT DOCUMENTS

| | | | |
|---|---|---|---|
| 402,743 | 5/1889 | King | 384/423 X |
| 2,917,302 | 12/1959 | Mattern et al. | 267/153 |
| 2,926,973 | 3/1960 | Ellis . | |
| 3,140,866 | 6/1961 | Zollner | 267/3 |
| 3,735,711 | 5/1973 | Hassenauer . | |
| 3,889,607 | 6/1975 | Hassenauer . | |
| 3,904,181 | 9/1975 | Harsy-Vadas | 267/3 |
| 4,130,066 | 12/1978 | Mulcahy . | |
| 4,198,037 | 4/1980 | Anderson | 267/153 |
| 4,566,678 | 1/1986 | Anderson | 267/141.1 |
| 4,712,487 | 12/1987 | Carlson . | |
| 4,793,720 | 12/1988 | Merker, Jr. | 384/423 |
| 4,924,779 | 5/1990 | Curtis et al. . | |
| 4,998,997 | 3/1991 | Carlston | 267/3 |
| 5,086,707 | 2/1992 | Spencer et al. | 105/199.3 |

*Primary Examiner*—Mark T. Le

[57] ABSTRACT

An improved side bearing for installation between a railcar body and the bolster of the railcar track, said side bearing having an open cylindrical housing with a mounting plate, a top cap for vertically reciprocating within said cylindrical housing and a one piece compression spring resisting the reciprocation of the top plate, the compression spring being formed, of a copolymer elastomer having a ratio of plastic strain to elastic strain that is greater than 1.5 to 1.

3 Claims, 1 Drawing Sheet

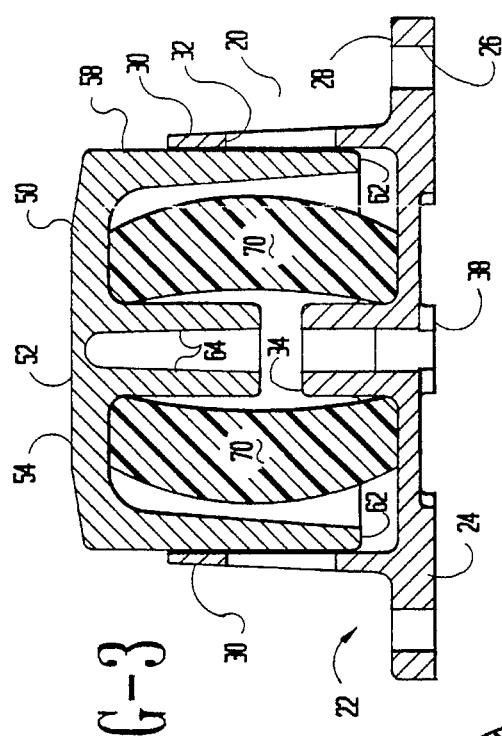
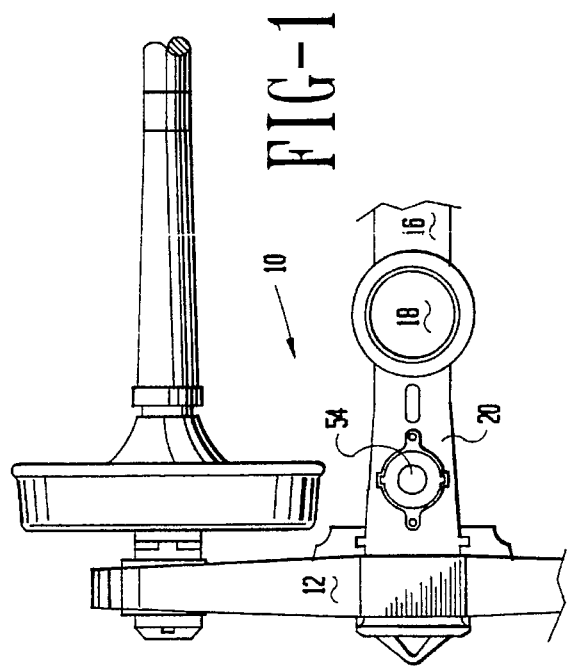
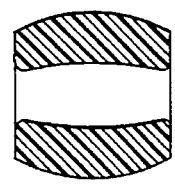
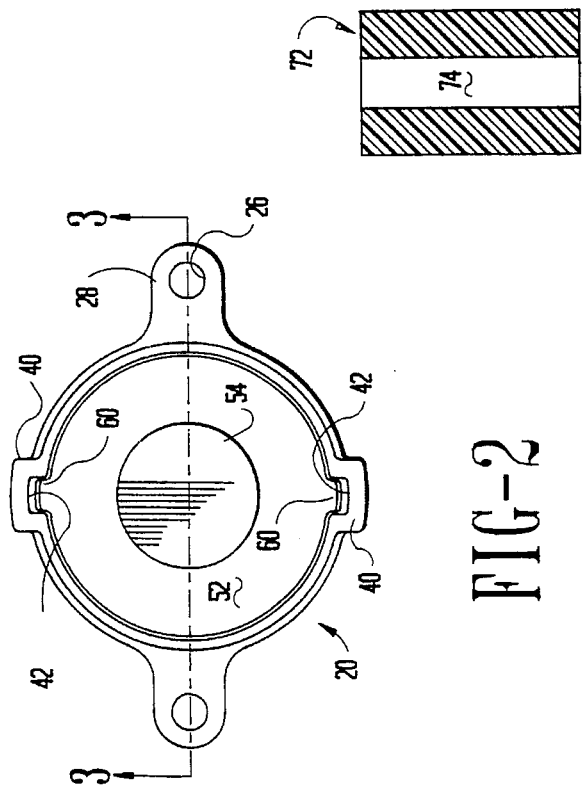
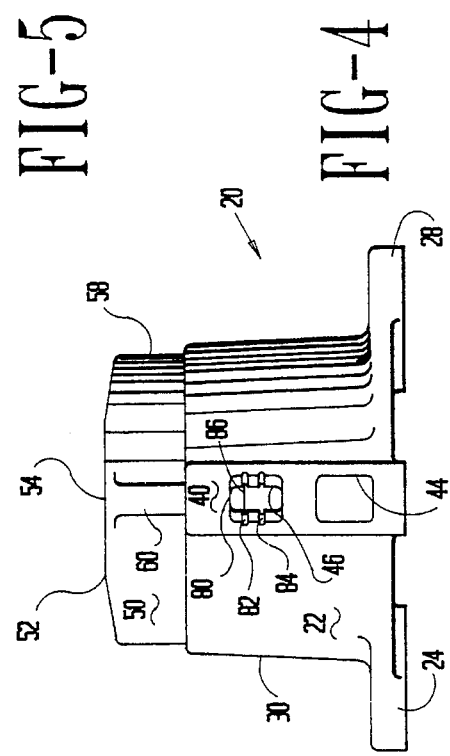

CONSTANT CONTACT SIDE BEARING

BACKGROUND OF INVENTION

1. Field of Invention

This invention relates to a low-cost, improved side bearing for railcars. Specifically, it relates to the bearings that are mounted between the railcar body and the trucks of railcars. Such bearings are needed to reduce the rocking forces of the railcar about the center plate of the railcar truck, to provide support for the railcar on the truck, and to reduce the yaw rotation of the railcar that results from the "hunting" of the wheels for the track. This hunting is reduced and opposed by the frictional forces between the railcar body and the side bearing of this invention.

2. Related Art

Side bearings, per se, are not new. Indeed, they have been long used on railcars and they are the subject of several prior patents. Illustrative of these prior patents is U.S. Pat. No. 4,712,487 which issued to Miner Enterprises, Inc. on a prior application by the present inventor. Like the present invention, that patent discloses a side bearing bottom housing and a top cap with a spring positioned between the two to urge the cap upward and into constant contact support of the railcar. In addition, this prior patent also discloses a spring of the same material as the present invention—a spring formed of a copolyester polymer elastomer. Another prior patent is U.S. Pat. No. 4,793,720 which issued to American Standard Inc. on an application of Walter H. Merker. Like the applicant's earlier patent, this American Standard patent also has a bottom housing, a top cap and a copolyester polymer elastomer spring.

The elastomer spring concept of both of these earlier patents is formed of a copolyester polymer elastomer such as that sold under the trademark Hytrel® by E. I. DuPont de Nemoirs & Co. The spring and the general method of making the spring from this elastomer was invented by David G. Anderson, another employee of Miner Enterprises, Inc. Several embodiments of Anderson's spring and the method of making it are disclosed in Anderson Pat. No. 4,198,037. Other embodiments of this spring are disclosed in a later Anderson U.P. Pat. No. 4,566,678 which also issued to Miner Enterprises, Inc. This patent is similarly directed to an elastomeric pad formed of a thermoplastic Hytrel® that was joined to metal plates and intended to be used in a railcar buffer unit as well as other shock absorbing applications. The subject matter of these two Anderson patents is incorporated by reference into this application.

SUMMARY OF INVENTION

This invention relates to a low-cost, improved side beating. It includes a cast bottom housing with walls that extend upward from a mounting flange. It also includes a top cap that has a flat surface in supporting engagement with a bottom wear surface of the railcar. The top cap has cylindrical walls extending downward to vertically reciprocate within the upwardly extending walls of the bottom housing. The bottom edges of the downwardly extending walls will engage the housing to limit the vertically reciprocation of the top cap. In addition, the bottom housing and the top cap are also provided with abutments or center posts for engaging one another when the weight or the movement of the car forces the top cap to reciprocate downward. This reciprocation is opposed by a single elongated generally cylindrical elastomer compression spring that has an aperture therethrough to receive the center posts. It is formed of an elastomer whose ratio of plastic deformation to its elastic deformation is greater than 1.5 to 1. Preferably, the elastomer is a copolyester polymer elastomer such as that manufactured and sold by E. I. DuPont de Nemoirs under the trademark Hytrel®. Generally, such elastomers, when molded are subject to a compression set and will not function as a compression spring. As noted, however, in the Anderson U.S. Pat. No. 4,198,037, such elastomers can be compressed so as to take a compression set and to orient the molecular structure of the material, and, subsequently, such elastomers can thereafter serve very effectively as a compression spring unit.

As will be reflected by the following specifications and drawings, the objectives of this invention are to provide, among other things, 1) a unique side bearing of the simple, cast design that facilitates manufacture with lowest possible cost;

2) a unique side bearing that can be manufactured without any machining steps so as to further reduce cost;

3) a simple three piece side bearing that is designed for assembly with the railcar so as to eliminate any cost of pre-assembly;

4) a side bearing having a lighter weight but provides equivalent or better wear and durability; and 5) a side bearing that can be easily installed to permit either a total travel and compression of five eights (⅝) inch or 1 inch according to the desire and requirements of the railcar builder.

DESCRIPTION OF THE DRAWINGS

The manner in which these objectives and other desirable characteristics can be obtained from this invention is explained in the following specification and attached drawings in which:

FIG. 1 is a plan view of a portion of a railcar truck-wheel assembly on which the side bearing of the preferred embodiment of this invention is to be installed;

FIG. 2 is a plan view of the preferred embodiment of this invention;

FIG. 3 is a sectional side elevation view of the side bearing of FIG. 2 taken along the lines 3—3 of FIG. 2;

FIG. 4 is a side elevation view of the preferred embodiment of FIG. 3;

FIG. 5 is a sectional side elevation view of the preform of the elastomer that is to be formed into the spring of the side bearing, the section being taken through a centerline of the preform; and FIG. 6 is a sectional side elevation of the elastomeric spring of my invention after it has been compressed and its molecular structure has been oriented.

DESCRIPTION OF THE PREFERRED EMBODIMENT

The preferred embodiment of my invention is illustrated in its intended environment in FIG. 1. This environment includes a railcar (not shown) which is supported by a separate truck unit 10 at opposite ends of the railcar. Only a portion of the truck 10 is depicted in FIG. 1. This drawing depicts one of the two side frames 12 which is supported by wheel sets 14 whose axle ends are mounted in a bearing carried by the side frame 12. (Only one of the wheel sets is shown). Each of the two wheel sets extend beneath the railcar to the opposite side frame 12 (not shown). Also extending between the side frames 12 is a bolster 16 upon which is mounted the primary support for the railcar—the centerplate 18, Each truck 10 is provided with two side bearings 20 which are mounted on opposite sides of the centerplate 18 of the bolster unit. The four bearings for the railcar are sized and installed in a manner to support as much as 85% of the weight of an empty railcar. The remainder of the weight of the railcar and the weight of the cargo is carried by the centerplate 18.

FIGS. 2 and 3 depict the structure and advantages of the side bearing 20 of this invention. It includes a bottom housing 22 which has an annular base 24 attached to the bolster 16 by bolts (not shown) extending through apertures 26 of the flanges 28. The bottom housing 22 is provided with cylindrical walls 30 that extend upward from the base 24 to guide the vertically reciprocal action of the top cap of the beating as will be explained. These cylindrical walls 30 may have cutouts 32 so as to reduce the material requirement and the weight of the unit. In addition, the circumference of the cylindrical walls are provided with two bosses 40 which are positioned at 180° apart and which extend vertically. The interior of each of these bosses 40 is provided with a keyway or groove 42 for receiving a mating tongue or spline from the top cap. Preferably, at least one of the bosses is provided with a circulation window or cutout 44 to permit air to circulate through the side bearing and reduce the heat. In addition, one of the bosses is also provided with a measuring window 46 as will be subsequently explained.

Extending from the center of the base 24 upward is a hollow center post or abutment 34. If the bottom of the base 24 is relieved as shown at 36, this center most must also extend downward, as at 38, to engage the surface of the bolster unit.

Mounted above the base member 24 is a top cap 50. This cap vertically reciprocates relative to the base member 24. It includes a top surface 52 composed of a first horizontal wear surface 54 which is mounted in contact with the bottom of the railcar. From this wear surface 54, the top 52 slopes downward as at 56 at a 5 degree angle to the edge of the top surface. Depending downwardly around the periphery of the top surface is a generally cylindrical wall 58 which reciprocates within the cylindrical wall 30 of the bottom housing. The cylindrical wall 58 is interrupted by vertical ridges or splines 60 which are located at approximately 180 degrees apart. These splines 66 reciprocate within and cooperate with the channel or key ways 42 of the bottom housing to maintain the top cap 50 in alignment with the bottom housing 22. The cylindrical wall 58 has a lower edge 62 which, upon downward reciprocation of the top cap 50 under the force of the railcar, will engage the inside surface of the bottom housing 22.

Within the cap 50 and depending downward from the wear surface 54 is a center post 64 which, under the force of the railcar, will engage or abut the center post 34 of the bottom housing 22.

The vertical movement of the top cap 50 is opposed by a compression spring 70. This compression spring is formed of an elastomer in general method disclosed in the Anderson U.S. Pat. Nos. 4,198,037 and 4,566,678. This spring 70 is made from a molded preform 72 (FIG. 5) which is formed of an elastomer that is very durable, inert to reaction with grime, salt and corrosive fluids, not subject to tear propagation, and has tensile characteristics such that the ratio of plastic strain to elastic strain is greater than 1.5 to 1. One such elastomer is the copolyester polymer that is sold by E. I. DuPont de Nemoirs under the trademark Hytrel®. Such elastomers are well known and are more fully described in the Anderson U.S. Pat. No. 4,198,037 as well as U.S. Pat. Nos. 3,763,109, 3,766,146 and 3,651,014. While the DuPont Company does provide this material under different composition numbers to reflect some minor variations in properties such as hardness, each will be suitable and a preference for any one of the compositions will be dependent upon the weight of the railcars, the amount of energy to be absorbed and factors related to the intended or specific application. For the present invention, Hytrel® type 4056 is preferred and has been found to be well suited.

In the preferred embodiment, the preform 72 of FIG. 5 is formed by molding the Hytrel® into a tube or slug having an outside dimension of approximately 3.25 inches, a bore 74 having an inside diameter of 1.31 inches and a height of 5.50 inches. If desired, the preform can be formed in elongated tube and machined to the desired dimensions. The preform 72 of the Hytrel® elastomer can be successfully also formed by melt casting, injection molding or other techniques recommended by the DuPont Company and well known to the molding industry.

After the preform has been made, it is compressed to a formed height of approximately 2.25 inches and held at that height for approximately one minute. This compression results in orientation of the molecular structure of the Hytrel® and causes it to take a compression set. Preferably, a button or rod is placed in the bore 74 prior to compression to prelude its distortions or collapse during the compression. Upon release of the compression force, the preform 72 will spring back to a portion of its former height to define the compression spring 70 as shown in FIG. 6.

In as much as various railcars and other energy systems have different weights and different desired ride or cushioning characteristics, there is no one manufacturing design for the spring 70 which will accommodate all railcar models or all cushioning applications. In practice, an efficient design procedure is to mold preforms of different sizes, compress them and then correlate their dimensions to their resulting spring rate. From this correlation, one can then interpolate or modify the dimensions until the desired spring rate is obtained for each railcar design.

Persons skilled in the art of plastic forming and compression spring design will also appreciate that many modifications of my invention will produce satisfactory results. Elastomers other than Hytrel® may be acceptable for some applications. In addition, the shape of the preform may be modified to achieve different spring characteristics.

In accord with the preferred embodiment of my invention, it is formed of only three elements which include this compression spring 70, the bottom housing 22 and the top cap 50. For purposes of simplicity and lower costs, the top cap 50 as well as the housing 22 are cast from austempered ductile iron using the lost foam process. With the design, as shown, no machining is required. Moreover, the cost of subassembly is also eliminated in that the three units are assembled together only at the railcar manufacturing site.

In operation, the side bearings cushion the roll of the railcar as it is pulled along the tracks. For some types of railcars, particularly articulated multi-platform cars, major car manufacturers prefer a side bearing that permits either a vertical travel of one full inch or a travel of five-eights of an inch. To provide for five-eights of an inch of vertical travel, the set-up height (vertical space between the car body wear plate and the bolster mounting when the car body is resting on the center plate) must be $5\frac{1}{16}(+/-\frac{1}{16})$ inch. To provide for 1 inch of vertical travel, this set-up height must be 5⁷⁄₁₆(+/−¹⁄₁₆) inch. The set-up height is established by addition or subtraction of shims between the car body and its associated wear plate.

In assembling the side bearing units onto a railcar, bottom housings 22 are mounted to the bolster 16 as illustrated in FIG. 1. Bolts, unnumbered, extend through the apertures 26 of the flanges and fix the housings 22 in place. The car body is then lowered onto the centerplate 18, and the set-up heights established by adding or subtracting shims as described above.

Once the set-up heights are established, the car body is raised and the side bearing parts are assembled into the bottom housing 22. The elastomer spring is provided with a bore 74 of various sizes depending upon the car body weight on which it will be used. Preferably, the elastomer bore size is selected to match the car body weights as shown in the following table:

| Elastomer Bore Diameter | Car Body Weight |
| --- | --- |
| 1.50 inches | 14,000–20,000 lbs |
| 1.25 inches | 20,000–36,000 lbs |
| 1.00 inches | 36,000–50,000 lbs |
| 0.75 inches | 50,000–110,000 lbs |

The various bore diameters are matched with the associated post diameter 34 in the housing and the associated post diameter 64 of the top cap 50. This results in a lock-out feature which precludes the installation of high preload elastomer springs into a railcar with a light body weight. The proper elastomer is then installed over the post 34 in the housing. Thereafter, a top cap 50 is placed over each of the four springs to complete assembly for the railcar.

After the side bearings are assembled, a railcar is lowered onto the centerplate 18 and the four bearings 20. The car body wear plates are resting on the side bearings and hold the side bearings together. The four side bearings should carry no more than 85% of the weight of the empty car body, and a minimum of 15% of the weight should be carried by the centerplate 18.

To facilitate inspection that proper set-up heights have been established upon assembly, each side bearing 20 is provided with an indicator window 80 on the bottom housing 22. At the sides of each window are two horizontal indicator marks 82 and 84. Alignment of one of these marks with a corresponding mark 86 on the spine 60 of the top cap 50 will indicate the proper set-up height of the side bearing 20. For example, alignment of the top mark 82 with the mark 86 on the spline reflects that the side beating 20 has been set-up at 5⁷⁄₁₆ inches to permit one inch of vertical travel. Alternatively, alignment of the lower mark 84 with the indentation of the spline of the top cap 50 50 reflects that the side bearing has been set-up at 5¹⁄₁₆ inches to provide for ⅝ inches of vertical travel.

According to specification M-948-77 of the Association of American Railroads (AAR) for truck side bearings, the side beating must act as a non-yielding support between the car body and the trucks. Significantly, the side bearing 20 has provision for strong and substantial vertical stops to limit vertical travel of the top cap 50 into the housing 22. The primary vertical stop is the lower edge 62 of the cylindrical wall 58 of the top cap 50. Upon maximum travel of the top cap 50, this edge engages the bottom housing to limit vertical travel to the top cap 50. In addition, the center post 64 of the top cap 50 will engage the center post 34 of the housing, preferably just prior to the engagement of the edges 62 with the bottom of the housing. Significantly, the center post will enhance the strength of the top cap 50 and its center wear surface 54.

In addition to limiting vertical movement of the railcar, the side bearings 20 provide substantial frictional engagement between the center wear surface 54 of the top cap 50 and the bottom surface of the railcar. This frictional engagement reduces relative horizontal movement between the railcar and the top caps 50. Significantly, this frictional engagement also reduces the tendency of the railcar and its associated trucks to "hunt" the rails or to reciprocate from one track to the other, thus reducing rail and wheel wear and permitting the train to be more stable at higher speeds.

In sum, the primary goal of this invention is to reduce the cost of side bearings and to improve durability of long travel side bearings. In large part, this objective is effected by the design of a side bearing that can be manufactured by casting and without further machining or pre assembly. The elimination of any concentrated wear areas has improved durability without any sacrifice in performance.

I claim:

1. An improved three piece side bearing for a railcar, said side bearing comprising:

a) a cast bottom housing having a base with a flange mounting plate adapted to be attached to a bolster of a railcar truck;

b) said bottom housing having an upwardly extending cylindrical wall section, said wall section having relatively thin walls and not being subjected to a compressive weight of the railcar;

c) said bottom housing also having a cylindrical, center post extending from said base to a position above said plate;

d) (a) a top cap having a wear resistant surface for engaging the bottom of a rail car, e) said top cap having downward depending cylindrical walls that telescope inside the extending walls of the bottom housing, said depending cylindrical walls terminating in abutment edges that engage the bottom housing to limit vertical reciprocation of the cap relative to the bottom housing;

f) said top cap also having a center post section extending downwardly in vertical juxtaposition with said cylindrical center post of said bottom housing for also assisting in limiting vertical reciprocation of the top cap relative to the bottom housing, and for supporting the wear surface of the top cap;

g) a continuously formed one piece, generally cylindrical elastomeric compressive spring having a top surface contacting said top cap, a bottom surface contacting said bottom housing, and a centerbore passing through said spring, said spring being formed of an elastomer having a ratio of plastic strain to elastic strain that is greater than 1.5 to 1, the molecular structure of said spring being oriented as a result of plastic deformation of said member in at least one direction, and h) said depending cylindrical wails of said top cap and said upwardly extending cylindrical wall section of said bottom housing being provided with at least one cooperating vertical guide for maintaining the alignment of said top cap with said bottom housing.

2. An improved side bearing as recited in claim 1 in which the molecular structure of the elastomer spring has been oriented by compressing it to approximately 60% of its original dimension so as to cause the elastomer to take a compression set and to provide a relatively constant spring rate.

3. An improved side bearing as recited in claim 1 in which said bottom housing and said top cap are manufactured without any machining operations.

\* \* \* \* \*